Figure 9:
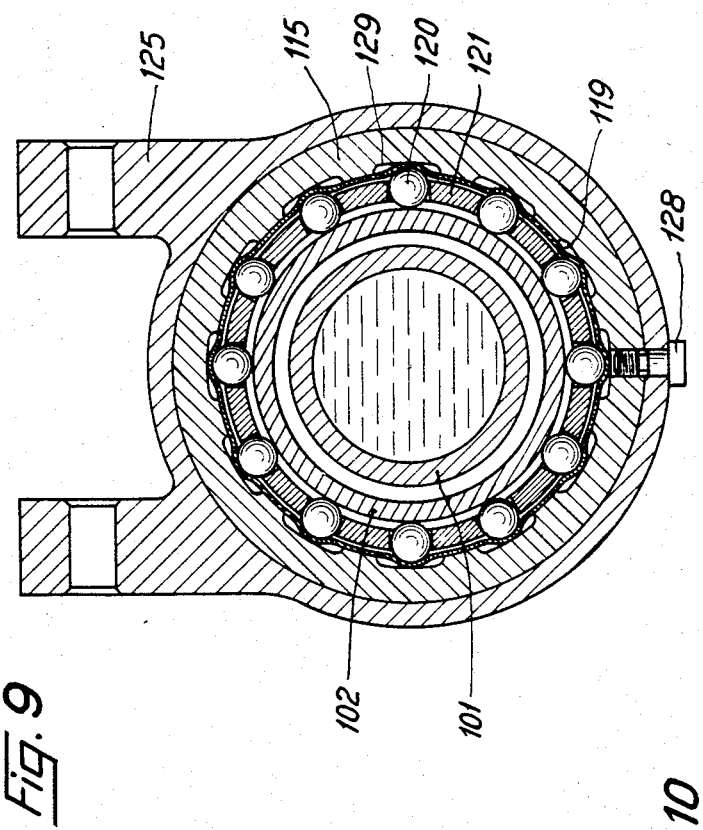

United States Patent [19]

Barnoin et al.

[11] Patent Number: 4,537,374

[45] Date of Patent: Aug. 27, 1985

[54] STRUCTURAL SUPPORTS AND AIRCRAFT LANDING GEARS INCLUDING SUCH SUPPORTS

[75] Inventors: Pierre Barnoin, Equilles; Jacques M. N. Mens, Marignane; Gilbert Merle, Saint-Victoret, all of France

[73] Assignee: Societe Nationale Industrielle Aerospatiale, France

[21] Appl. No.: 405,647

[22] Filed: Aug. 5, 1982

[30] Foreign Application Priority Data

Aug. 10, 1981 [FR] France ................................ 81 15432

[51] Int. Cl.³ .............................................. B64C 25/60
[52] U.S. Cl. ............................... 244/102 R; 188/371; 244/104 R
[58] Field of Search ........ 244/102 R, 102 SL, 102 A, 244/100 R, 102 SS, 104 R, 104 FP; 188/371, 271, 311, 313, 314, 280, 375; 92/85 R; 267/153

[56] References Cited

U.S. PATENT DOCUMENTS

| | | | |
|---|---|---|---|
| 2,369,007 | 2/1945 | Beecher | 188/271 |
| 2,752,112 | 6/1956 | Payne | 244/102 |
| 3,356,318 | 12/1967 | Livshits et al. | 244/102 R |
| 3,538,785 | 11/1970 | Grancon | 188/371 |
| 3,664,463 | 5/1972 | Kuethe | 92/85 R |
| 3,820,634 | 6/1974 | Poe | 267/153 |
| 3,862,668 | 1/1975 | Lindbert et al. | 188/376 |
| 3,904,153 | 9/1975 | Watts | 244/102 SL |
| 3,997,133 | 12/1976 | Fagan | 188/375 |
| 4,150,805 | 4/1979 | Mazelsky | 244/122 R |

FOREIGN PATENT DOCUMENTS

| | | | |
|---|---|---|---|
| 556947 | 5/1954 | Canada | 244/102 SL |
| 2918179 | 11/1980 | Fed. Rep. of Germany | |
| 1549884 | 11/1968 | France | |
| 2010302 | 6/1969 | France | |
| 2085498 | 12/1971 | France | |
| 2110078 | 5/1972 | France | |
| 458005 | 12/1936 | United Kingdom | 244/102 SL |
| 1195445 | 6/1970 | United Kingdom | |

Primary Examiner—Galen L. Barefoot
Attorney, Agent, or Firm—Karl W. Flocks; Sheridan Neimark; A. Fred Starobin

[57] ABSTRACT

A structural support comprises inner and outer elements which are telescopingly engaged, a cage secured to the inner element and having apertures in which balls are disposed which are disposed radially between the two elements, and a frangible connection securing the two elements against relative axial movement. In the locked relative positions of the elements, the outer element has locally an increased internal diameter portion and the balls are radially disposed in this position or are moved into the portion on being subjected to an axial force which breaks the frangible connection, so that the relative axial movement of the elements results in the ball plastically deforming the outer element and absorbing energy from the force to protect the body carried by the support. The support can be used to provide a brace operating as a strut and/or a tie, or a shock absorber, or, by mounting a damping piston slidably in the inner tubular element can provide a shock absorbing piston and cylinder unit. The outer tubular element may itself form an external cylinder or may be a liner in an external cylinder.

3 Claims, 18 Drawing Figures

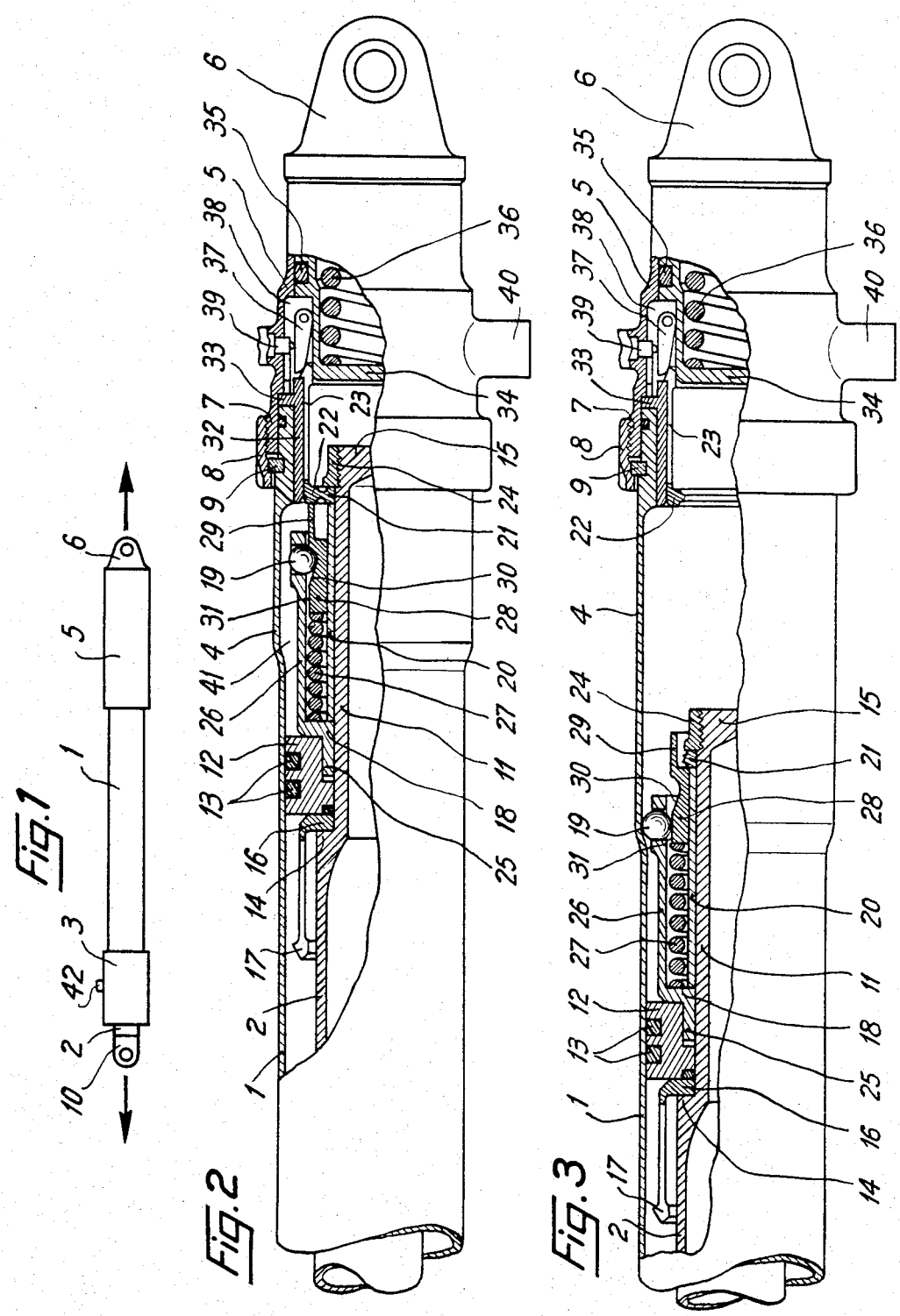

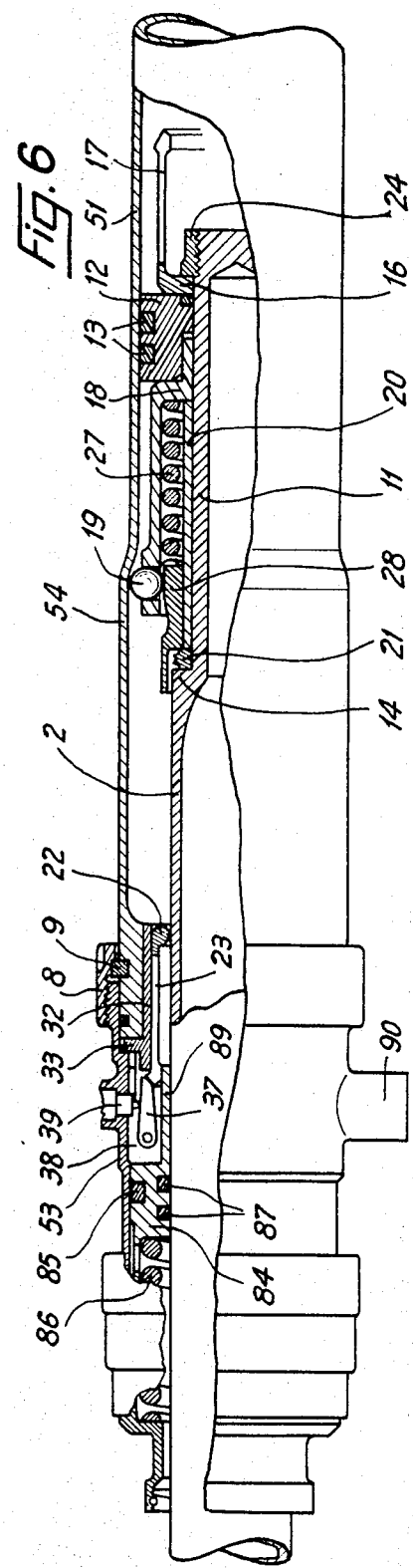

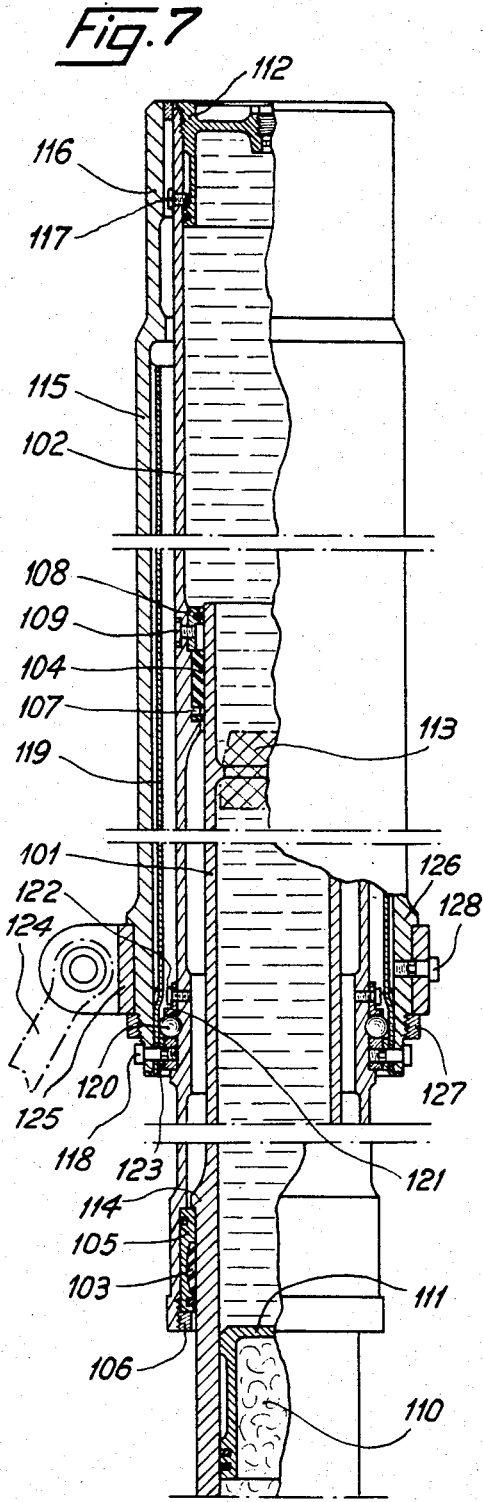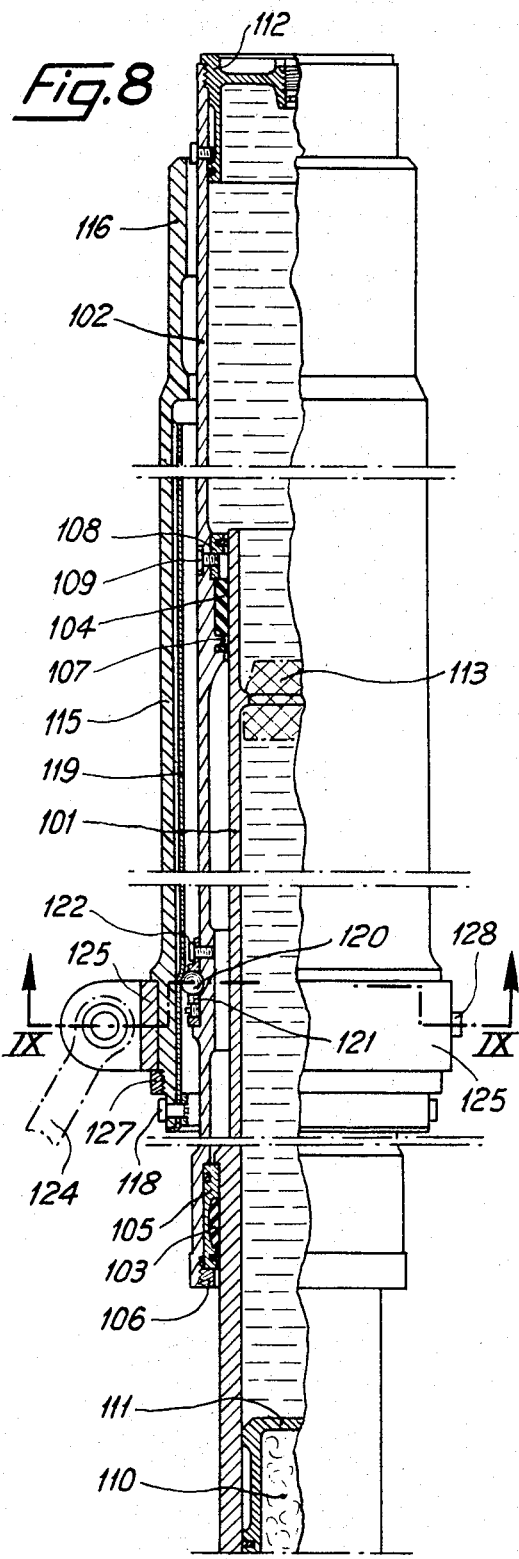

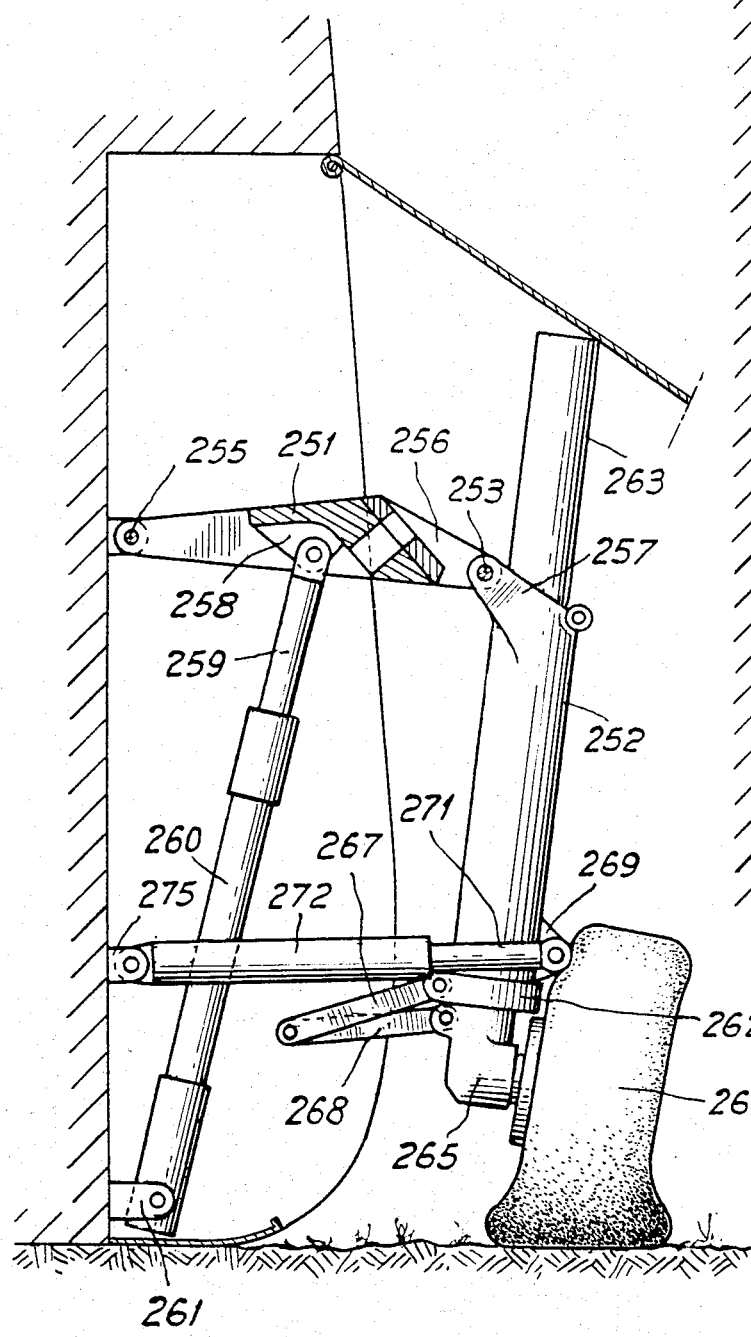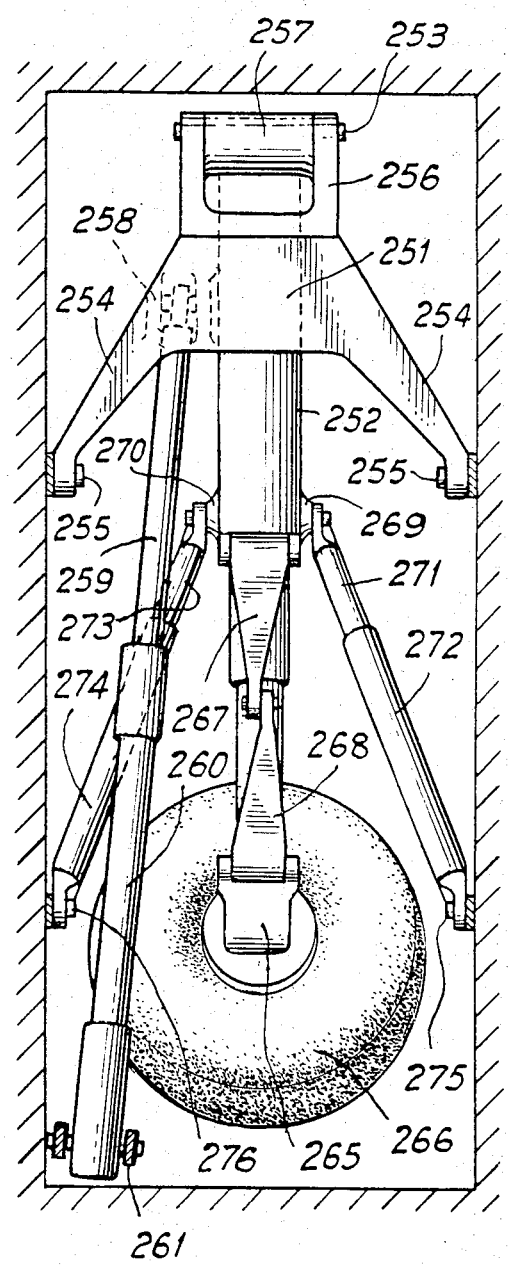

STRUCTURAL SUPPORTS AND AIRCRAFT LANDING GEARS INCLUDING SUCH SUPPORTS

The present invention concerns structural supports provided with means for absorbing energy and aircraft landing gear equipped with such structural supports. The invention has a particularly useful but not exclusive application in hydraulic and/or mechanical structural supports, such as piston-and-cylinder units, shock absorbers and braces intended for equipping the landing gear of helicopters so as to impart to the latter what is commonly termed "anti-crash" capacity.

French Pat. No. 1549884 and its Certificate of Addition No. 2010302 disclose means for absorbing energy by plastic deformation and force-limiting means which comprise rolling elements such as balls or rollers which are arranged between two telescopic members in such a way that upon the occurrence of a shock causing telescopic displacement of the two members, the rolling elements bring about progressive plastic deformation of at least one of the two telescopic members because of the fact that the rolling elements are gripped between the telescopic members and are made of a material which is harder than the material which constitutes at least the member that deforms, and in which latter material the rolling elements form grooves.

In accordance with the abov-mentioned Certificate of Addition, the rolling elements are held in predetermined positions in apertures formed in a sleeve, which is disposed coaxially between telescopic members of generally cylindrical shape and is adapted to be displaced together with these rolling elements and to maintain a predetermined space between them during their rolling movement resulting from relative displacement of the telescopic members, so that this sleeve acts as a cage for the rolling elements.

In these arrangements, the rolling elements, gripped between the telescopic members, are fitted in such a way as to apply a compressive load to these rolling elements between portions of the telescopic members in such a way that, in the zone of contact with the telescopic members, these rolling elements apply a mean contact pressure having a value higher than the contact pressure causing deformation of the material which at least the deformable telescopic member is made, that is to say, greater than the pressure at which there occurs distribution of the strains leading to plastic deformation in the zone of contact, this plastic deformation causing increased and localized dissipation of energy.

The level of the dissipation of energy per unit of displacement of the telescopic members depends on the degree or the depth of the plastic deformation which in turn depends upon the loading of the rolling elements, that is to say upon their number and upon the extent of the gripping action which is defined on the basis of the extent to which the radial or diametric dimension of the rolling elements is greater than the difference between the radial dimensions or between the outer and inner radii of the telescopic members in the zone of contact prior to deformation. This value for the dissipation of energy also depends upon the relative hardnesses of the materials of which the rolling elements and the telescopic members are made.

The use of means of this kind provides energy-absorption characteristics which can be predicted with great precision. Thus, it is possible to achieve constant absorption along the path of the telescopic members if the thickness of the latter and the degree of gripping are kept constant. It is also possible for one or even both of the telescopic members to be produced in such a way that it or they has or have an internal or external dimension which varies in a continuous fashion so as to provide a converging or diverging part, for example, so that the rolling elements encounter respectively increasing or diminishing resistance when one of the telescopic members is displaced relative to the other. Also, the wall-thickness of one or the two members may vary over the length of the members so as to offer variable resistance to plastic deformation.

In the use of these energy-absorption means in the equipment of the steering columns of vehicles, as described in the above-mentioned Patents, a steering shaft is provided which comprises two parts which are fitted telescopically one within the other and are caused to rotate in unison by means of pegs which also are held in axial positions relative to each other for normal operation. This steering shaft is mounted to rotate in a supporting case constituted by a lower tubular portion solidly connected to the chassis of the vehicle and is telescopically fitted in an upper tubular portion which is connected to the instrument panel by a fitting comprising unidirectional shear pins. Provided between the overlapping zones of the lower and upper tubular portions are two axially spaced annular rows of rolling elements, which are angularly distributed around the lower and inner tubular portion, the elements in one rwo being angularly staggered relative to those in the other. In response to an axial impact, causing compression of one or other of the telescopic members and generally sufficient force on the pins to cause them to shear, the two portions constituting the steering shaft becomes telescopically compressed as do the two tubular portions of the supporting casing, and this causes plastic deformation of at least one of the tubular portions and therefore considerable dissipation of energy so that the forces transmitted by the supporting casing are limited to a value that is considerably lower than that resulting from the axial impact.

Also, French Pat. No. 2110078 discloses energy-absorption means, the construction of which is similar in many ways to that of the means described above, since they comprise pressure-applying devices likewise in the form of balls, rollers etc., but also in the form of a ring, and means intended to cause relative displacement of said pressure-applying devices and of an energy-absorbing member are present in the form of a sleeve.

The means intended to cause relative displacement comprises a supporting member which is presented to the energy-absorbing member and carries, for example in a radial chamber having at least one tapered wall facing said last-mentioned member, the pressure-applying means so that the latter move with the displacement of the supporting member relative to the energy-absorbing member and are pushed into the latter.

However, the mode of operation of these means is fundamentally different from those previously considered above, since the energy-absorption member is an elastically deformable element, which is stated in French Pat. No. 2110078 to be an elastomeric element and which is designed to undergo localized elastic deformation by compression as well as elastic compression and elongation which are distributed laterally in relation to the zone of localized elastic deformation.

The energy-absorbing member, consisting of a sleeve having elastomeric properties and made in particular of natural rubbers or silicone, makes it possible to provide a means which offers the advantages of a hydraulic or pneumatic shock-absorber, since the impacts and shocks can be absorbed by means of a low-cost construction of reduced weight.

The present invention is concerned with adapting the devices for absorption of energy by plastic deformation of the type described in French Pat. No. 15409884 and the Addition thereto, No. 2010302, so as to enable those devices to be used in supports which perform a main hydraulic and/or mechanical function, such as a piston-and-cylinder unit, performing a manoeuvring and/or wind-bracing function, or an oil and air shock-absorber, which itself already constitutes a means for absorbing and dissipating energy, or such as a wind-brace of a main element, so that these components are able to perform an additional function in the absorption of energy and/or the limitation of force, the purpose being to afford safety and protection to a structure, with which these supports are associated and which comprises parts to which violent forces, resulting from impact and shocks directed on to the structure, should not be transmitted without damping, attenuation and limitation.

This is the situation with aircraft. the cabins of which must be protected as far as possible, in case of accident, so as at least to ensure survival of the people aboard and, if possible, to preserve the major part of the aircraft, and an important application of the invention is in providing landing gear for aircraft, especially helicopters, which can be equipped with supports in accordance with the invention and having an "anti-crash" capacity.

According to the invention, there is provided a structural support comprising a tubular outer element, an inner element telescopingly engaged in the outer element, one of which elements is capable of plastic deformation, a cage secured to the other of the elements at a location within the tubular outer element, a plurality of rolling members located in respective apertures in the cage and disposed between the inner and outer members, means on said other of the elements for locating the rolling members in a radial position to deform said one element plastically, and a frangible connection between the inner and outer elements which connection locks the inner and outer elements against relative axial movement but is adapted to fracture under a predetermined axial loading applied between the inner and outer elements, whereby fracture of the connection allows relative axial movement of the inner and outer elements which causes the rolling elements to deform said one element plastically and dissipate energy from the force producing the movement.

According to the invention, the outer tubular element may form the external casing of the support or may be surrounded by an external cylinder member, with sufficient radial clearance to permit the plastic deformation caused by the rolling elements, the outer tubular element being removable to enable the support to be reconditioned by replacement of the element and the frangible element.

Depending upon whether the inner element is connected to the outer element in the retracted position, the halfway position or the extended position respectively, the means for absorbing energy by plastic deformation associated with the support can be used in the case of loads above the fracture threshold of the frangible element while in tension only, in tension or compression, and in compression only.

Preferably, where the support is used as a shock absorber the inner element is tubular and has a tubular piston member mounted therein for axial sliding movement, and the support further comprises a closure member sealing one end of said inner element, the tubular piston member extending through the other end of the inner element, a transverse wall member in the tubular piston member which wall member has therein a throttling aperture for throttling flow of a fluid between a chamber within the end portion of the inner element closed by the closure member and a second chamber formed in the tubular piston member at the side of the transverse wall remote from the closure member.

It is well known that, when a shock absorber is subjected to high-velocity shock or impact, throttling no longer takes place and the piston member is effectively locked in its position in the inner element of the shock absorber. Consequently, and in accordance with this preferred feature of the present invention, use is made of a threshold for actuating the means associated with the shock absorber, for absorbing energy by plastic deformation, that is greater than the forces to which the shock absorber is subjected under normal operating conditions but is less than a force that would endanger the structure supported by the shock-absorber in the event of locking of the piston member in this way.

Structural supports in accordance with the invention can be made which offer the advantage that the useful stroke of their means for absorbing energy by plastic deformation and/or their means for limiting force is the same as that of their pistons and piston rods when these supports are performing their main function, while at the same time they offer the advantages of a series mounting arrangement. The length of the support thus need not be altered by the inclusion of the additional function of absorbing energy and/or limiting force, as compared with prior structural supports.

The invention also provides main landing gear for an aircraft comprising a plurality of ground engaging elements each of which is carried by a leg in the form of a substantially vertical structural support; said support comprising a tubular outer element, an inner element telescopingly engaged in the outer element, one of which elements is capable of plastic deformation, a cage secured to the other of the elements at a location within the tubular outer element, a plurality of rolling members located in respective apertures in the cage and disposed between the inner and outer members, means on said other of the elements for locating the rolling members in a radial position to deform said one element plastically, and a frangible connection between the inner and outer elements which connection locks the inner and outer elements against relative axial movement but is adapted to fracture under a predetermined axial loading applied between the inner and outer elements, whereby fracture of the connection allows relative axial movement of the inner and outer elements which causes the rolling elements to deform said one element plastically and dissipate energy from the force producing the movement, the inner element being tubular and having a tubular piston member mounted therein, and the support further comprising a closure member sealing one end of said inner element, the tubular piston member extending through the other end of the inner element, a transverse wall member in the tubular piston member which wall member has therein a throttling aperture for throttling flow of a fluid between a chamber within the end portion of the inner element closed by the closure member and a second chamber formed in the tubular piston member at the side of the transverse wall remote from the closure member, and an external cylinder member within which said outer tubular element is mounted.

Figure 10:
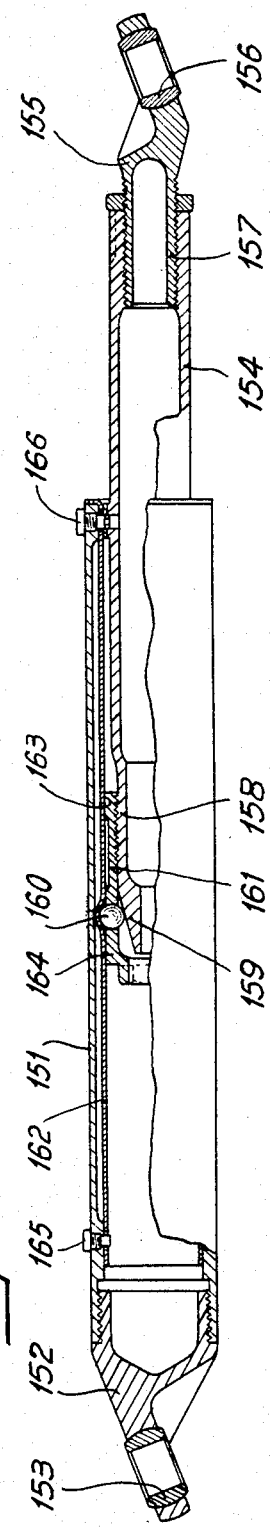
Figure 11:
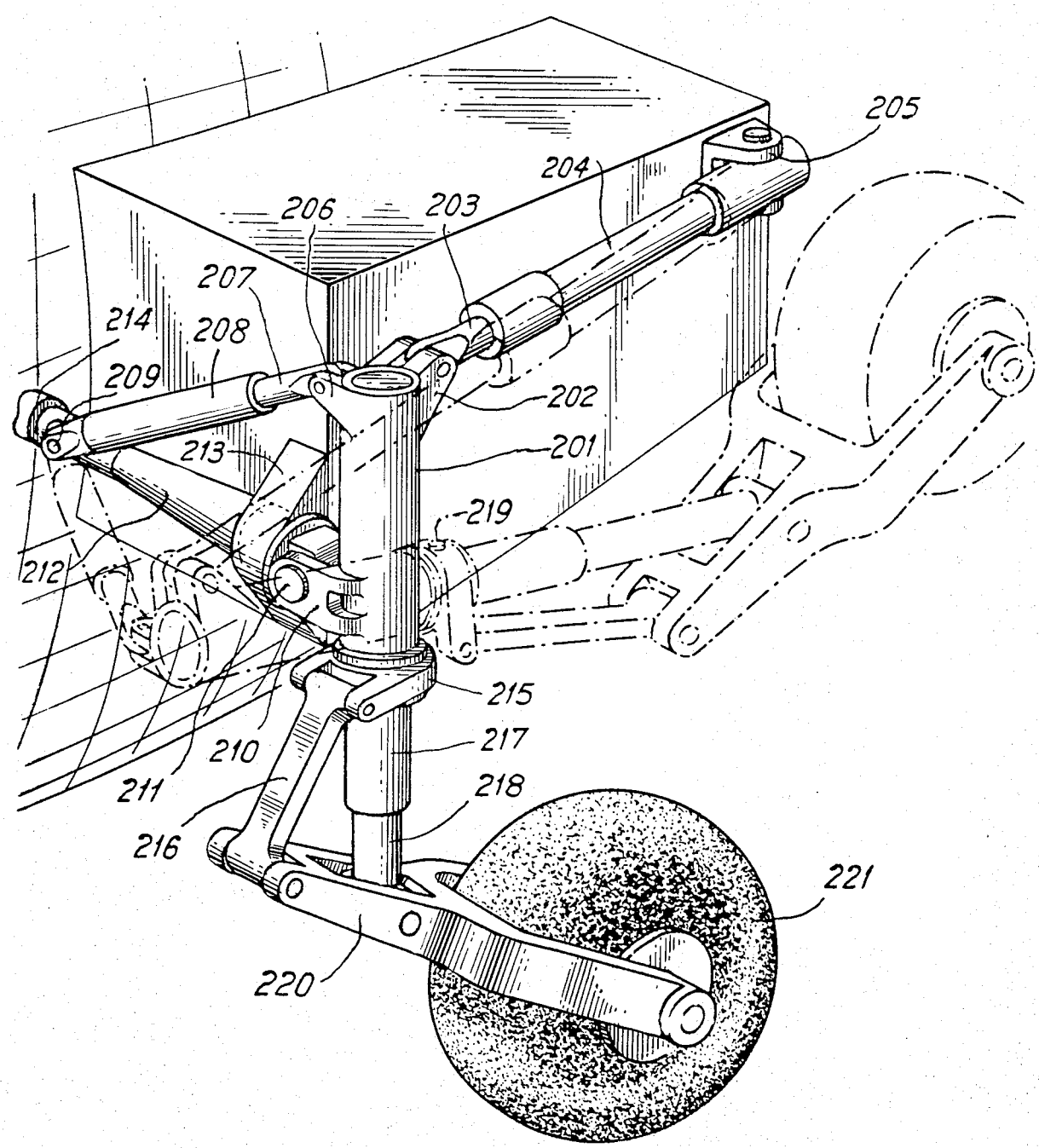
Figure 12:
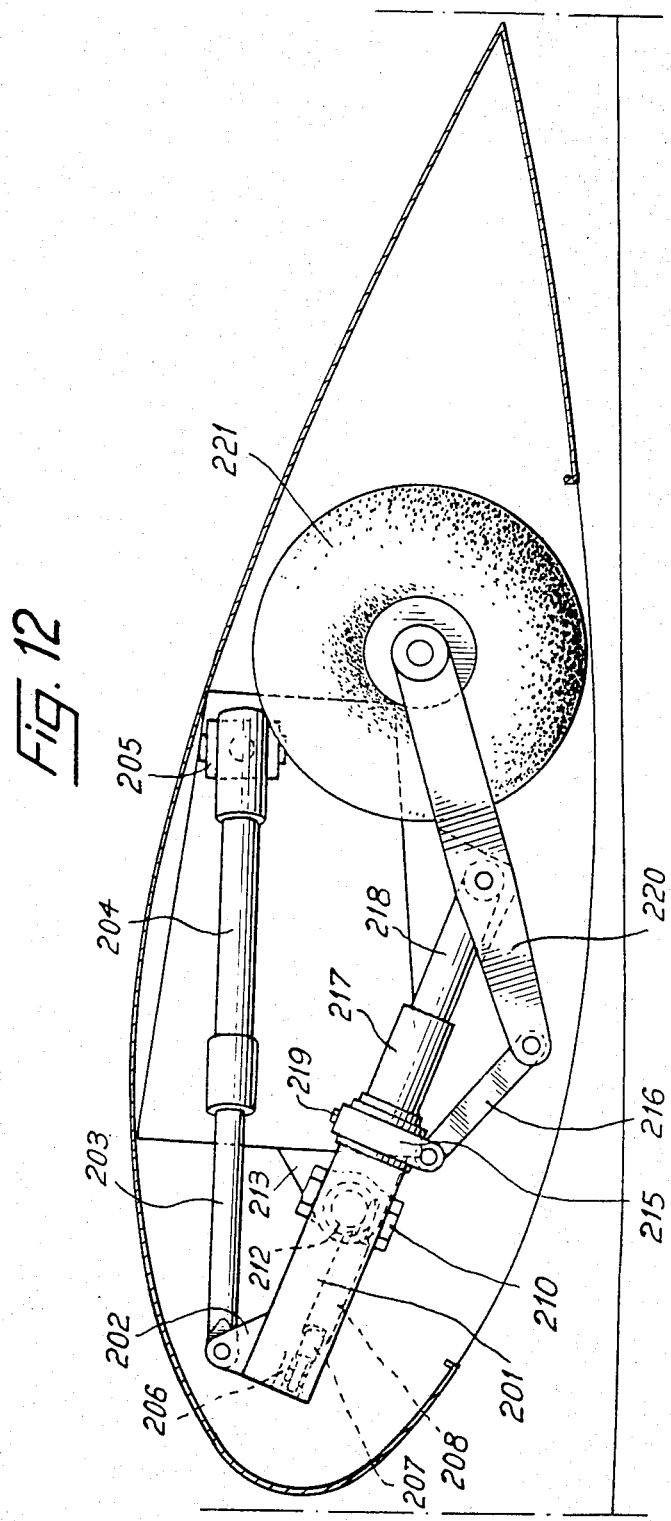
Figure 13:
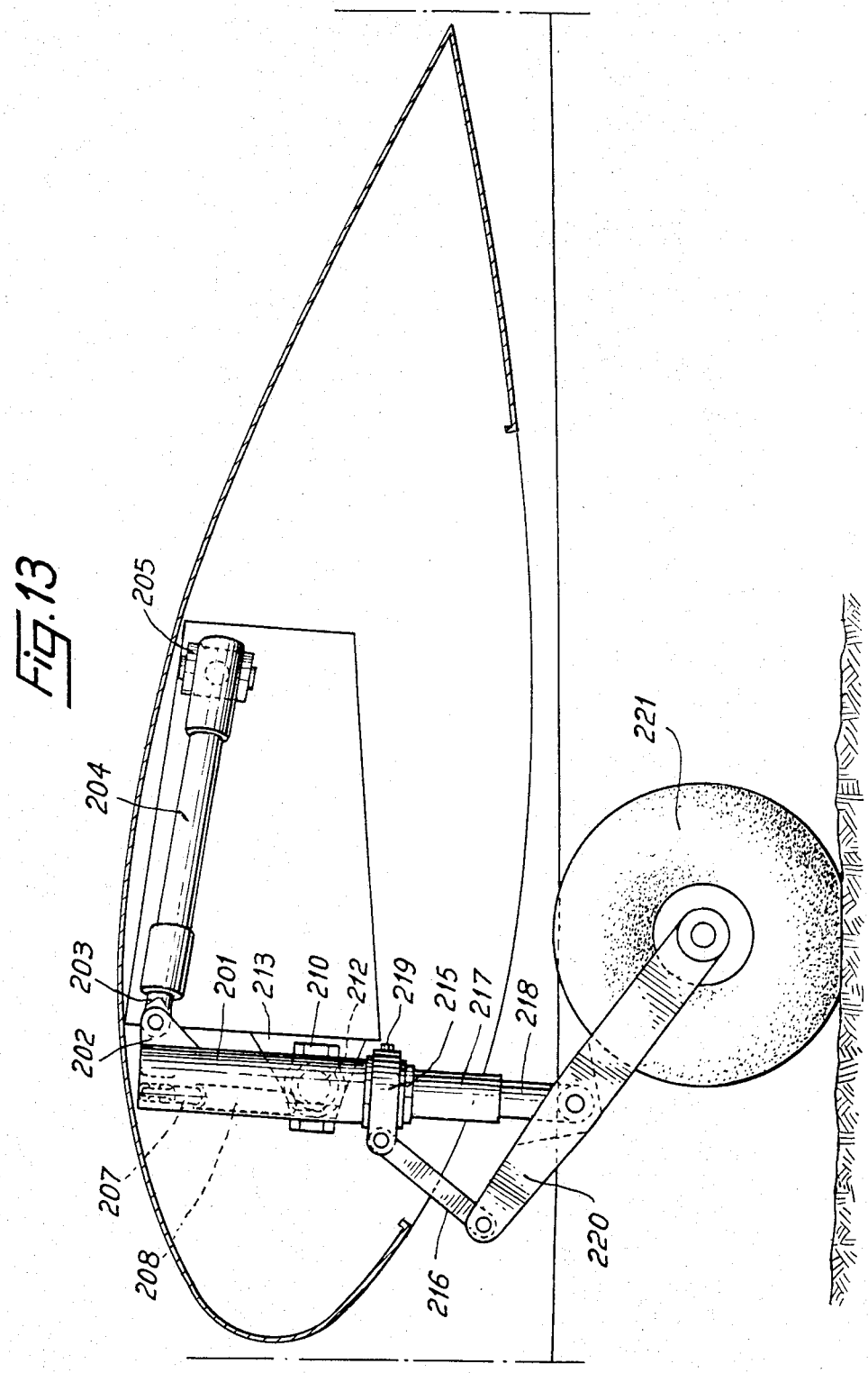
Figure 14:
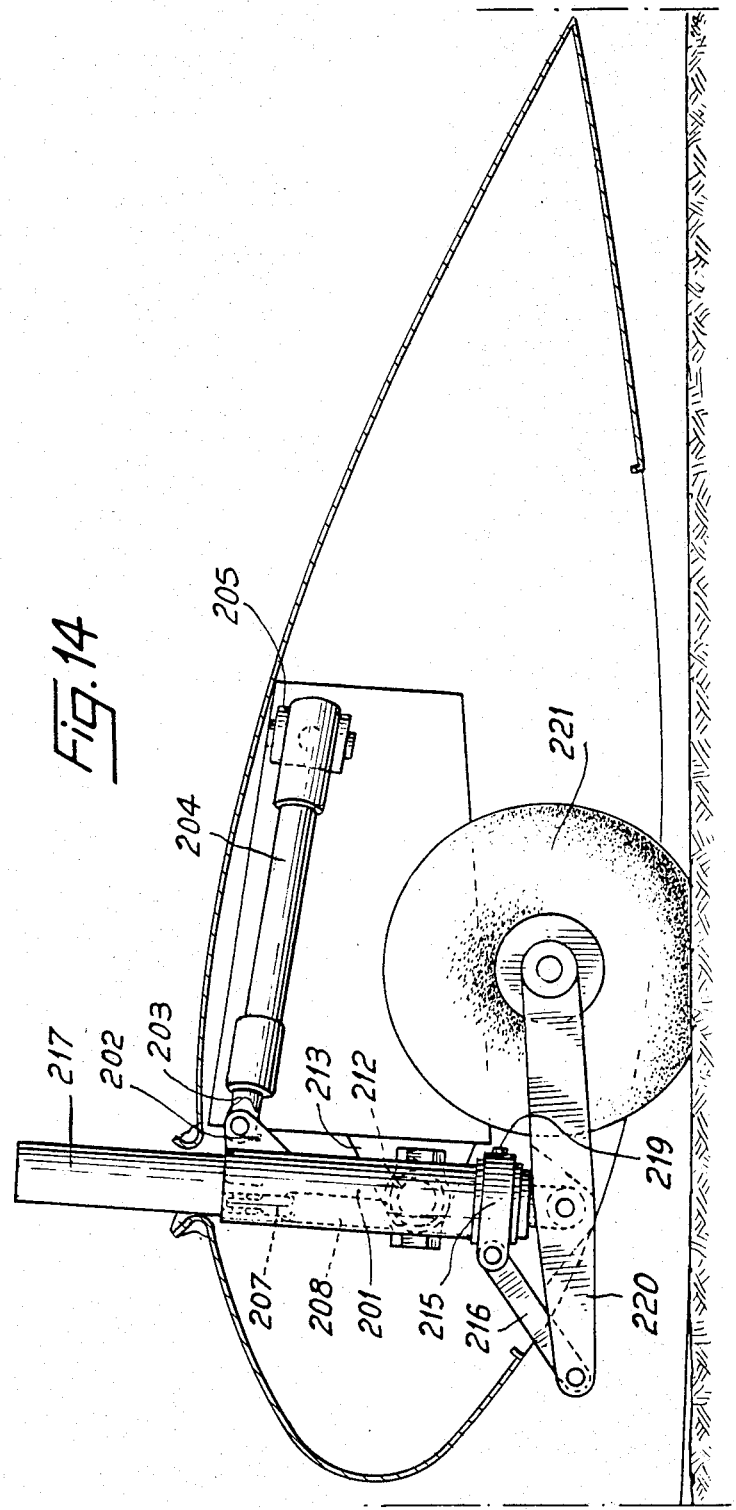
Figure 15:
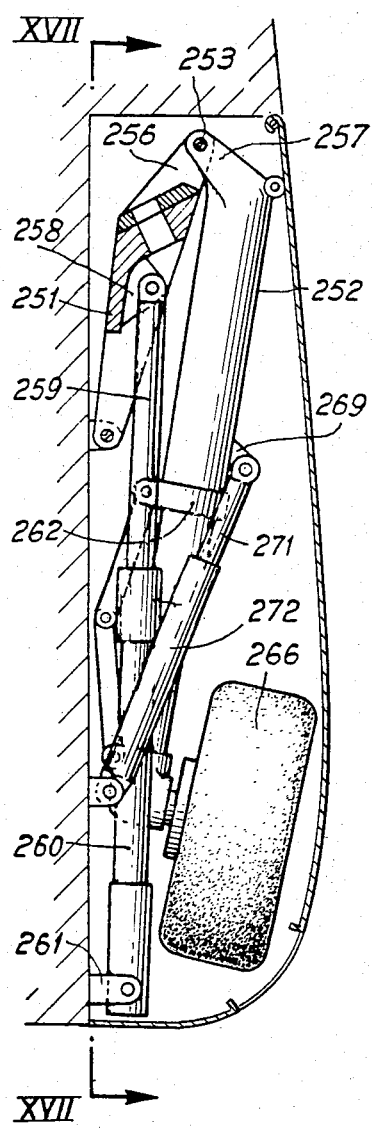
Figure 16:
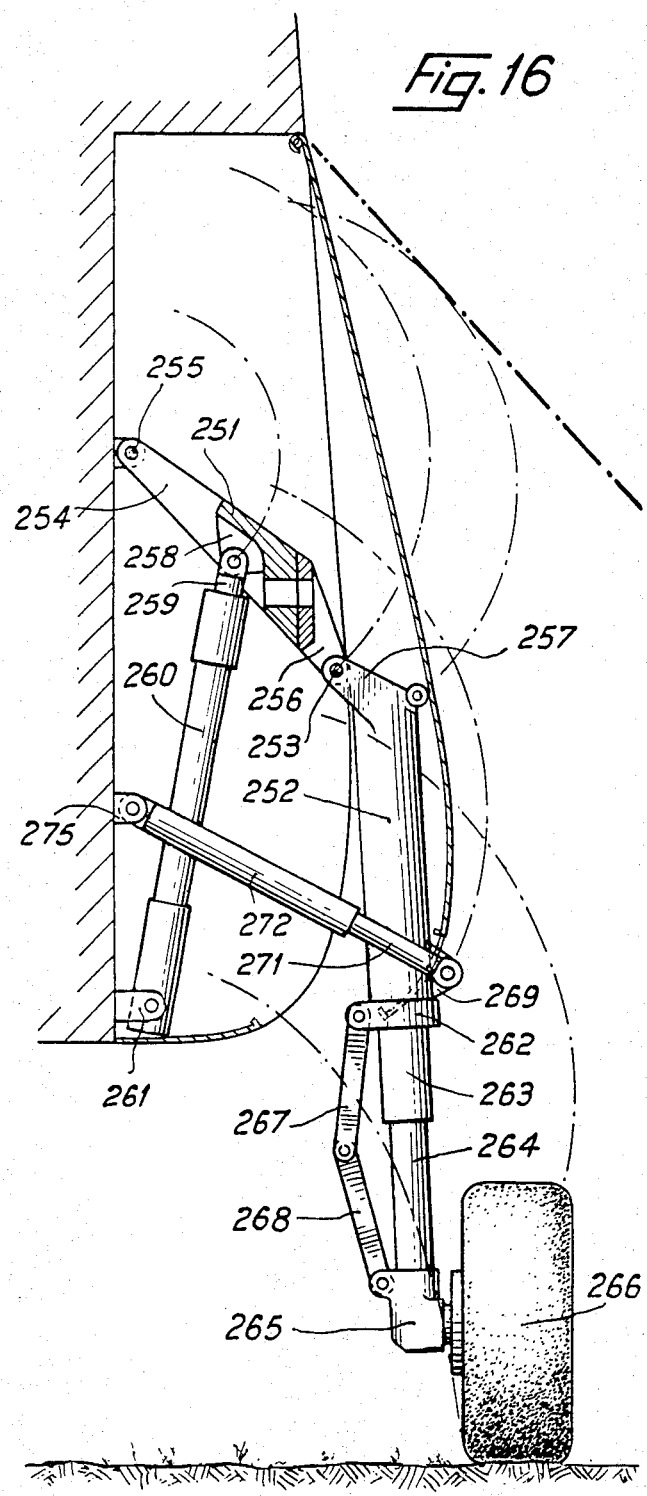

The present invention will be better understood with the aid of the specific examples of construction which are described below as non-limiting examples with reference to the attached drawings, in which:

FIG. 1 is a diagrammatic view of a piston-and-cylinder unit embodying the invention, provided with a means for absorbing tensile energy by plastic deformation, and/or a means for limiting tensile force, FIGS. 2 and 3 are views, partly in section, of one end of the piston-and-cylinder unit of FIG. 1, before and after fracture of the frangible element, FIG. 4 is a view similar to that of FIG. 1 and shows a piston-and-cylinder type support according to the invention, whose means for absorbing energy by plastic deformation and/or its means for limiting force is or are intended to be subjected to a compressive load, FIGS. 5 and 6 are similar to FIGS. 2 and 3, and relate to the piston-and-cylinder type support of FIG. 4, FIGS. 7 and 8 are views, partly in section, of a shock absorber provided, according to the invention, with a means for absorbing energy by plastic deformation and/or a means for limiting force, particularly in the case of the leg of a landing unit, FIG. 9 is a sectional view along line IX—IX of FIG. 8, FIG. 10 is a view, partly in section, of a brace provided, according to the invention, with means for absorbing energy by plastic deformation and/or means for limiting force, FIG. 11 is a perspective view of one side unit of a main landing gear comprising a balance-beam and designed to be retracted upward and longitudinally towards the rear, said landing unit being equipped with a piston-and-cylinder unit, a shock absorber and a brace as illustrated in the preceding Figures, FIGS. 12, 13 and 14, respectively, are side views of the landing gear unit of FIG. 11 in the positions "gear retracted", "gear extended" under static load, and "gear extended" after or during an energy absorbing and force limiting phase following a landing manoeuvre involving an abnormally high vertical speed, FIGS. 15 and 16 respectively, are front views in the "gear retracted" position and the "gear extended" position of a lateral unit of a main landing gear which is associated with the fuselage and is retracted upward and laterally.

FIG. 17 is a side view of the landing-gear unit along the line XVII—XVII of FIG. 15, and FIG. 18 is a front view of the landing-gear unit of FIGS. 15 to 17 when retracted and after or during an energy-absorbing and/or force limiting phase following a landing manoeuvre at an abnormally high vertical speed.

Referring to FIGS. 1 to 3, the piston-and-cylinder unit is constituted by a cylinder, in which is mounted to slide, without clearance, a rod 2 which is guided at the end 3 of the cylinder 1 through which it extends by a ring and at least one dynamic sealing member (not illustrated). The other end of the cylinder 1, having a cylindrical portion 4 of greater inside diameter, is closed off by a hollow ferrule 5. At one of its ends this ferrule 5 carries an attachment means 6, and at its other end it has an external screw-threaded cylindrical portion 7, whereby the ferrule 5 is fitted around the end of the portion 4 of the cylinder 1 and is retained on portion 4 by means of a nut 8, which is retained on the cylinder 1 by a stop ring 9 fitted in a channel in the outer face of the cylinder 1, a sealing ring being interposed between the portion 7 of the ferrule 5 and the portion 4 of the cylinder 1. At its end outside the cylinder 1, the rod 2 is provided with an attachment means 10, and a its end within the cylinder 1 has a portion 11 of smaller diameter and has a piston 12 provided with dynamic sealing members 13 which slide on the inner wall of the cylinder 1 and guide the rod 2 when it is displaced relative to the cylinder. Arranged in succession on the portion 11 of the rod, and proceeding from a radial shoulder 14 at the change of diameter towards the closed externally screw-threaded end 15 defining the portion 11 of the rod 2, are (i) a boss 16 having a set of resilient claws 17, designed to engage resiliently in a recess formed in the end 3 of the cylinder 1 to ensure locking of the hydraulic piston-and-cylinder unit in a "rod extended" position (in a manner similar to that described hereinafter for locking in a "rod retracted" position as illustrated in FIG. 2); (ii) the piston 12; (iii) a cage 18 accommodating balls 19; (iv) a distance sleeve 20; (v) inner rim 21 of a boss which has a set of axially-extending resilient claws; and (vi) a retaining nut 24 screw-threaded on to the closed end 15 of rod 2. The rim 21 is separated from a radially outer rim 22 of the boss by a section designed to shear under a predetermined load, so that a frangible element, hereinafter referred to as a "mechanical fuse", is formed. The cage 18 has a cylindrical portion 25 of reduced external diameter disposed radially between the piston 12 and the portion 11 of the rod 2, and a cylindrical portion 26 of increased inside and outside diameter and containing radial bores which are centred in a diametral plane and in each of which is received a ball 19. Portion 26 surrounds a spring 27 which is in turn disposed around the distance sleeve 20. At one of its ends the spring 27 bears against the shoulder that separates the two cylindrical portions 25 and 26 of the cage, and at its other end the spring 27 bears against a ring 28. The ring 28, of cylindrical exterior shape and mounted to slide around the distance sleeve 20, is provided with an end-piece 29 whereby it bears against the outer rim 22 of the mechanical fuse, and in its outer face ring 28 contains a channel 30 of part-circular cross-section which merges through a tapered surface with the outer cylindrical surface 31 of the ring 28, which latter surface extends towards the shoulder against which spring 27 bears.

Locking of the rod 2 in the retracted position in the cylinder 1 is achieved by resilient engagement of the heads of the claws 23 behind a stop formed by the end of a sleeve 32 within the cylinder 1. Sleeve 20 is disposed radially between an end zone of the portion 4 of the cylinder and the set of claws 23, and is held in position by having its outer radial shoulder 33 gripped between a radial shoulder of the ferrule 5 and the end of the portion 4 of the cylinder 1. Locking of the claws 23 in this position, wherein the rod is retracted, is achieved by a stop means comprising a locking sleeve 34 mounted to slide, without clearance because of the presence of a sealing member 35, in a bore of the ferrule 5 and urged by a spring 36, bearing against the closed end of the ferrule 5, towards the interior of the cylinder 1 so that it becomes lodged within the heads of the claws 23 so as to prevent the latter from moving radially inward and disengaging from the end of the sleeve 32. The stop means has associated with it a locking-control means comprising a pawl 37 which is mounted to pivot by one of its ends in a chamber 38 of the ferrule 5, and the other end of which is applied against a radially-outwardly facing surface of the head of one of the claws 23.

When locking takes place, the claws cause the pawl 37 to become displaced which actuates a contactor 39. An indicating means on the control panel of the aircraft enables the crew to check that the retracted rod is locked in position.

When the chamber 38 of the ferrule 5 is brought under pressure through the supply connection 40 delivering hydraulic fluid, the piston 34 is pushed towards the closed end of the said ferrule and against the spring 36; this results, in succession, in unlocking of the claws 23, initial displacement of the rod 2 and the released claws 23 along the cylinder 1 towards the position in which the rod is extended, and the supply of pressurized fluid to the chamber defined by the cylinder 1, the rod 2 and the piston 12. This causes the rod to become extended and, at the end of its stroke, the rod is locked in the extended position by co-operation of the claws 17 with a stop means similar to that described above but disposed in the end 3 of the cylinder 1 through which the rod 2 extends. The locking piston of this stop means is therefore an annular piston.

The hydraulic piston-and-cylinder unit described above, which is mechanically locked and hydraulically released in the two positions at the respective ends of its stroke is intended to be solidly connected, by the attachment means 6 of its cylinder 1 and the attachment means 10 of its rod 2, to two elements which, in certain circumstances, the piston-and-cylinder is required to displace relative to each other and, in other circumstances, is required to retain rigidly in position in relation to each other, when the rod is in the retracted position and when encountering a load acting upon one of the two elements. When this load is one that causes tensile loading of the piston-and-cylinder unit to an extent greater than a maximum permissible force which may be transmitted by the piston-and-cylinder unit from one to the other of the elements without risk of damaging one of the latter, it is obvious that the piston-and-cylinder unit should be capable of limiting the transmitted force to a predetermined acceptable value and therefore of absorbing and dissipating a certain amount of excess energy. This is achieved by rating the section which ruptures under a predetermined shear load and which separates the interior and exterior rims 21 and 22 respectively of the frangible element, at the value of the maximum tensile force that can be transmitted, this representing the value for initiating the operation of the means for absorbing energy by plastic deformation, with which the piston-and-cylinder unit is equipped.

In the case where the tensile force on the piston-and-cylinder unit reaches the predetermined initiation value, the frangible element breaks and the inner rim 21 becomes separated from the outer rim 22 and the claws 23 which are held in position by the stop means. The rod 2 starts to move out of the cylinder 1, and the spring 27 becomes extended and holds the ring 28 through its endpiece 29 in abutment with the outer rim 22. However, since the cage 18 is driven, together with the rod 2, by means of the distance sleeve 20 associated with the inner rim 21 and the nut 24, the portion 26 of the cage 18 is axially displaced in relation to the ring 28 and causes balls 19 to move out of the groove 30 because of the inclined surface which connects the groove to the outer cylindrical surface 31 of the ring 28, the balls 19 coming to rest on this surface. The balls 19 are thus caused to project into the annular chamber 41 delimited by increased-diameter end-portion 4 of the cylinder 1, following rupture of the frangible element. Under the effect of tensile force, the rod 2 is then displaced in the cylinder 1, driving the balls 19, positioned by the cage 18 in such a way as to bear radially inwards on the cylindrical portion 31 of the ring 28. Since the balls 19 are greater in diameter, by a predetermined amount, than the difference between the inside diameter of the cylinder 1 over the middle portion of its length and the radius of the cylindrical surface 31 of the ring 28, then when they reach the end of the chamber 41 they cause plastic deformation of the cylinder 1 during the remainder of the stroke of the rod 2 in the cylinder 1, as illustrated in FIG. 3, and this causes absorption and dissipation of energy which enables the force transmitted by the piston-and-cylinder unit to be limited to an acceptable value at least for as long as deformation continues.

The amount of energy absorbed is determined in particular by the degree of indentation causes by the balls 19, by their number and by the thickness of the cylinder 1, as well as by the relative hardnesses of the materials selected for producing these elements. If absorption of energy is to be constant, deformation will be constant over the entire length of movement of the balls 19, by making use of a cylinder of constant cross-section and thickness, but if a variable absorption is required along the path of movement of the balls 19, the cylinder may be of variable thickness adapted to suit the required profile.

If the required effects result in a form of the cylinder 1 that is incompatible with its performing its normal function as a component of a hydraulic piston-and-cylinder unit having a cylinder capacity which, taking into account the hydraulic pressure obtaining in the hydraulic supply circuit, is adapted to suite the forces to be developed for movement over a required path and for locking in position the two elements to which the piston-and-cylinder unit is connected, then the cylinder 1 may have an internal liner which is plastically deformable under the same conditions and is designed to give radial clearance sufficient for permitting plastic deformation caused by the balls 19.

The piston-and-cylinder unit which has just been described offers the advantage that the distance travelled by the balls 19 is practically the same as the stroke of the rod 2 in the cylinder 1, while at the same time the advantages are provided of a series assembly of a combined arrangement which performs the functions of a piston-and-cylinder unit and the absorption of energy and/or limitation of force. The length of the piston-and-cylinder unit is therefore not altered by the addition, to its main function, of a further function of absorbing energy and/or limiting force.

It should also be noted that a burstable diaphragm of a given rating or an excess-pressure valve 42 is fitted in that end 3 of the cylinder through which the rod 2 passes, so as to permit the annular chamber formed between the cylinder 1 and the rod 2 to be exhausted to the exterior of the piston-and-cylinder unit by way of the piston 12 and the end 3 of the cylinder 1, so that the hydraulic fluid which fills this chamber does not oppose the displacement of the piston 12 with the rod 2 in the cylinder 1 following rupture of the frangible element and subsequent displacement of the balls 19 which cause plastic deformation of the cylinder 1.

FIGS. 4 to 6 illustrate a piston-and-cylinder unit provided with a means for absorbing energy and/or limiting force which is intended to be subjected to a compressive load, starting from the extended position of the rod, by a force greater than a permitted maximum value.

The elements of this piston-and-cylinder unit, which are identical to those of the piston-and-cylinder unit described by reference to FIGS. 1 to 3, carry the same reference numerals as in these latter Figures.

In particular, it should be noted that the rod 2 is identical but that the parts which it carries on its reduced-diameter end portion 11 are arranged in an opposite sequence so that the claws 23 may be locked by a stop means accommodated in the ferrule 53 at that end of the cylinder 51 through which the rod 2 passes. Thus, it is the inner rim 21 that is gripped between the shoulder 14 of the rod 2 and the distance sleeve 20, whereas the inner rim 16 of the claws 17 is gripped between the piston 12 and the nut 24. The cage 18, the balls 19, the ring 28 and the spring 27 occupy the same positions as before in relation to the piston 12 and the inner rim 21, the arrangement forming a system for displacing the balls outward to project into the annular chamber defined by the increased-diameter portion 54 of the cylinder 51 following fracture of the frangible element.

The stop means, accommodated in the ferrule 53, comprises an annular locking piston 84 mounted to slide without clearance, within a bore formed in the ferrule 53, because of the presence of a packing element 85, and around the rod 2, because of the presence of the packing elements 87. The piston is acted on by a spring 86 so that the axial extension 89 of the piston 84 locks the claws 23 behind the shoulder of the sleeve 32, the radial shoulder 33 of which is pressed against the end of the portion 54 of the cylinder 51 by the ferrule 53. The latter has a chamber 38 in which is pivotably mounted the pawl 37 which applies load to the contactor 39 when the claws 23 are locked, said ferrule also having a connection 90 for supplying hydraulic fluid for effecting hydraulic unlocking and actuation of the piston-and-cylinder unit.

The mode of operation of this piston-and-cylinder unit is in all respects similar to that of the unit described by reference to FIGS. 1 to 3, apart from the fact that the means for absorbing energy and/or for limiting force is triggered by a compressive force greater than the predetermined shear load of the frangible section between the outer and inner rims 22 and 21 of the frangible element, said force being applied to the piston-and-cylinder unit when locked in the position in which the rod is extended. Consequently, the burtsable diaphragm of a given rating or the excess-pressure valve, indicated at 42 in FIG. 4, is provided on the ferrule 55 at the end of the cylinder 51 through which the rod 2 does not pass, so as to permit emptying of the cylinder 51 when the rod 2 moves into the cylinder after rupture of the frangible element.

Referring to FIGS. 7 to 9, an oil and air shock absorber in accordance with the invention comprises a rod 101 mounted to slide, without clearance, in a substantially vertical cylinder 102, and guided by means of rings 103 and 104. The ring 103 is fitted in a channel formed in the inner face of a cylindrical ferrule 105, which is retained in a chamber at the lower end of the cylinder 102 by means of a nut 106. Ring 104 is held by an annular axial stop 108 against a radial shoulder 107 which is machined in a thickened portion on the inner wall of the cylinder 102 substantially half way along the cylinder. Engaged in said stop 108 are screws 109 which extend through radial bores formed in the cylinder 102. At its lower portion, the rod 101 closes off a chamber 110 containing pressurized gas, for example nitrogen. Chamber 110 is separated by a dividing piston 111 mounted to slide without clearance in the rod 101 from a quantity of oil filling the remainder of the rod 101, as well as the portion of the cylinder 102 located below the ring 104, the cylinder 102 being closed off by a cap 112 screwed into its upper end. In its upper end portion, the rod 101 carries a means 113 for dissipating energy by throttling of oil; this means is illustrated symbolically, since it may be constituted by any known throttling means, e.g. permanent orifices of the diaphragm type which can be closed by a valve operation for example as a function of the pressure or the speed of displacement of the rod 101 in the cylinder 102, the cross-sections of these orifices being constant or variable as a function of the speed and/or direction of displacement of the rod in the cylinder; alternatively, a central orifice could be formed in a transverse wall of the rod 101 and could be traversed by a pin of variable cross-section carried by the cap 112 so that the cross-section of the passage varies as a function of the distance travelled by the rod in the cylinder.

When the shock absorber is not under load, the chamber 110 containing pressurized gas seeks to force the oil from the rod 101 into the cylinder 102 through the throttling means 113, and this ensures that the rod 101 moves out of the cylinder 102 until the rod moves into the fully extended position, illustrated in FIG. 7, in which position the outer radial shoulder 114 on the rod 101 moves into abutment with the ferrule 105.

Under load, the rod 101 is pushed towards the interior of the cylinder 102 so that the oil in this cylinder is forced into the rod 101 through the means 113, causing dissipation of a certain amount of energy by throttling, and the oil compresses the gas chamber 110 which resiliently absorbs a further amount of energy, which is consequently restored at least partially so as to bring the rod 101 into a position of equilibrium under the loead in the cylinder 102.

The cylinder 102 itself is contained in and coaxial with the body 115 of generally cylindrical shape and having an upper portion 116 of smaller inside diameter, in which the cylinder 102 is located against rotation by a screw 117 in the cylinder 102 engaged in an axial groove formed in the body 116.

Near the lower end of the body 115, a plurality of bolts 118, the end of the shanks of which are screw-threaded, extend through respective radial bores formed in the body 115 and through holes pierced in the increased inside diameter lower portion of a plastically deformable liner 119 provided within the body 115 along the inner wall of the increased inside diameter portion. Sufficient radial play is provided to permit plastic deformation of this liner 119 by balls 120 held in a cage 121 secured to the outer face of the cylinder 102 by bolts 122, in which face is screw-threaded the end of the shank of each bolt 118, which end is in each case separated from the unthreaded portion by a section which shears under a predetermined load, or a frangible section, so that the shanks of the bolts 118 form a mechanical fuse for the axial movements of the cylinder 102 in the body 115. The unthreaded portion of the shank of each bolt 118 also passes through a centering ring 123 arranged between the liner 119 and the cage 121. As will be seen from FIGS. 7 and 8, the balls 120 are disposed in a channel formed around the cylinder 102, and their diameter is greater than the difference between the radius of the portion of the liner 119, which is of smaller inside diameter, and the radius measured from the base of the channel in the cylinder 102.

In those cases where the rod 101 is to be guided in translatory movement in the cylinder 102 without rotating relative to the latter, a strut, one arm (not illustrated) of which is connected to the lower portion of the rod 101, has its other arm 124 articulated to a clevis 125 which is held around the lower portion of the body 115, between a shoulder 126 of the latter and a nut 127, and rotates in unison with the body 115 because of the presence of a bolt 128. The shank of bolt 128 has an unthreaded portion which extends through a radial bore in the clevis 125 and is separated from a screw-threaded portion engaged in the body 115 by a section having a predetermined shear load, designed to be frangible, so that the shank of the bolt 128 constitutes a mechanical fuse for rotation of the rod 101 in the body 115.

In the event of a shock or load applied to the rod 101 and tending to move the latter into the cylinder 102 at a speed such that the cross-section for the passage of oil through the throttling means 113 is inadequate, the shock absorber then virtually behaves as a rigid rod of constant length which transmits to the body 115, and therefore to the suspended mass, the entire force to which the rod 101 is subjected at its lower end.

When this transmitted force reaches the value for triggering the means for absorbing energy and/or limiting force with which the shock absorber is equipped, that is to say the predetermined value of the shear load of the shanks of the bolts 118, these shanks break, and the cylinder 102 slides in the body 115 and drives the balls 120 by way of the cage 121. The balls 120 cause plastic deformation of the liner 119 along its generatrices, and this causes absorption and dissipation of energy, which can be adjusted to a selected value, under the same conditions as before, such adjustment being achieved by appropriately selecting the number of balls, their diameter, the hardness of the balls and of the liner, as well as the thickness and profile of the latter. The force transmitted from the rod 101 to the body 115 can therefore be limited to an acceptable value.

When the rod 101 is loaded torsionally in relation to the cylinder 102 and therefore in relation to the body 115 and beyond the breaking load of the shank of the bolt 128, this shank breaks since the torsional moment is transmitted by the shank to the clevis 125, and the clevis 125 is then able to turn freely about the body 115.

It will be seen that the shock absorber offers the advantage that the stroke of the energy-absorbing means is only slightly less than the length of the body 115, and that this length is not altered by the inclusion of the additional function of absorbing energy and/or limiting force.

As shown in FIG. 9, the body 115 may have, in its inner wall, longitudinal grooves 129 in which plastic deformation of the liner 119 will take place, and the liner bears elsewhere radially outwards on thickened portions of the body 115 that separate the grooves 129 from each other.

The brace illustrated in FIG. 10 is constituted by a body 151 of cylindrical shape, one end of which is closed off by a ferrule 152 which is screw-threaded into the body 151 and is provided with a mechanical connecting means such as a swivel joint 153. A rod 154 extends through the other end of the body 151. The outer end of rod 154 also carries a ferrule 155, which is provided with a swivel joint 156 and is screw-threaded into the rod 154 to a varying extent so as to adjust the length of the brace to a required dimension, because of the presence of a screw-threaded portion 157. Rod 154 has, within the cylinder 151, an externally screw-threaded cylindrical portion 158 of reduced inside diameter, and has an adjoining tapered end portion 159. On this latter portion bear balls 160, which are held in a tubular cage 161 screw on the portion 158, the balls sliding within a plastically deformable liner 162 which, at a point roughly midway along its length, has a recess accommodating the portion of the balls 160 which project from the cage 161. The liner is fitted inside the body 151 with sufficient radial clearance to permit its plastic deformation accompanied by the absorption and dissipation of energy, when the balls 160 are displaced together with the rod 154, by way of the cage 161 in one or other direction within the body 151. To improve guidance during displacement in the two axial directions the cage 161 has cylindrical end portions 163 and 164 respectively, which slide within the liner 162 prior to its deformation. The liner 162 is held in the axial position in the cylinder 151 by bolts 165, each having a partially threaded shank in screw-threaded engagement in a radial bore in the cylinder 151 at its end adjacent the ferrule 152, and by bolts 166, each having a partially threaded shank in screw-threaded engagement in a radial bore in the cylinder 151 at its end through which the rod 154 passes. The unthreaded portions of the shanks of the bolts 165 and 166 extend through holes formed in the ends facing the liner 162. The unthreaded portion of the shank of each of the bolts 166 also has a frangible section which shears at a predetermined breaking load so that it forms a mechanical fuse. The ends of these shanks extend into respective radial holes formed in the rod 154 so that the bolts 166 ensure that the rod 154 is axially locked in the initial position in the cylinder 151.

The brace is thus constituted by a rod 154 locked in the halfway-extracted position in the cylinder 151 by mechanical fuses, which are broken at a predetermined value for the compressive or tensile load applied to the brace and corresponding to the value for triggering the means for absorbing energy and/or limiting force, by plastic deformation of the liner 162 by the balls 160.

It will be clear that in this arrangement the stroke of the energy-absorbing means is limited approximately to half the length of the body 151.

However, if the energy-absorbing means of the brace is intended to be subjected only to a compressive load or only to a tensile load, the rod 154 can be locked in an initial position in which the rod is extracted or retracted respectively, by means of the bolts 166, so that almost the entire length of the cylinder 151 can be used for the stroke of the energy-absorbing means. The liner 162 can in that case be crimped on to the ball 160 by its corresponding end.

It is also possible to dispense with the liner 162, which has however the advantage of being replaceable after deformation, and to form the brace in such a way that the balls 160 cause plastic deformation of the cylinder 151.

The piston-and-cylinder unit, the shock absorber and the brace that have been described by reference to FIGS. 1 to 10 are well suited for inclusion in the equipment forming the landing gear of aircraft, particularly helicopters, to which these components enable "anti-crash" characteristics to be imparted.

In normal use and before the aircraft lands, the legs of the landing-gear units have to be held rigidly in position in relation to a cell to which they are directly or indirectly connected, and only after take-off can the landing-gear units be raised and retracted either into the aerofoils or into the fuselage of the aircraft, or into wing stubs or caissons provided at the side of the lower portion of the fuselage. Rigid positioning of the legs of the landing-gear unit, which carry the ground-contact element, such as a wheel, runner or skid, by means of a suspension unit, for example an oil and pneumatic shock absorber housed in the drum of the leg of the landing-gear unit and absorbing the energy of impact, is generally achieved by means of mechanical or hydraulic struts of constant length or of the telescopic kind, and by means of hydraulic or mechanical or even electrical jacks adapted to function as bracing members and/or as manoeuvring members.

The left-hand landing-gear unit, illustrated in FIGS. 11 to 14 and forming part of a main landing-gear system for a helicopter, is of what is known as the "balance-beam" type and can be retracted longitudinally towards the rear into a wing stub or fin or into a fuselage caisson. The right-hand landing-gear unit is symmetrical to the left-hand unit in relation to the longitudinal plane of symmetry of the helicopter. The landing-gear unit comprises a leg which is substantially vertical when the gear is lowered, and the body of which is constituted by the body 201 of a shock absorber such as that previously described by reference to FIGS. 7 to 9. The body 201 has, at its upper end, a longitudinally extending attachment means 202 on which is pivotably mounted one end of the rod 203 of a piston-and-cylinder unit arranged in a substantially longitudinal direction and similar to that previously described with reference to FIGS. 1 to 3. The cylinder 204 of this unit is mounted to pivot on an attachment means 205 solidly connected to the structure of the fin of the helicopter and to the rear of the transverse plane passing through the body 201 when the landing gear is in the extended position. Furthermore, the body 201 has at its upper end a transverse attachment means 206 which is directed towards the cell of the helicopter and on which is articulated the end of the rod 207 of a strut such as that previously described with reference to FIG. 10 and arranged in a transverse plane; the cylinder 208 of the strut is articulated at 209 on the structure of the fin near a retraction shaft 212 described hereinafter.

The body 201 also has, at a point substantially halfway along its length, a transverse attachment means 210 extending towards the cell of the helicopter; with the aid of said attachment means, the body 201 is mounted to pivot about a longitudinal and substantially horizontal spindle 211 carried by a transverse shaft 212 which is mounted to pivot in bearings 213 and 214 associated with the structure of the fin. As in the shock absorber shown in FIGS. 7 to 9, there is located, at the lower portion of the body 201, the lower portion of the cylinder 217 of the shock absorber which is held in the body 201 by the frangible element of the means for absorbing energy by plastic deformation, and which in turn accommodates a rod 218. Said lower portion of the body 201 also carries a clevis 215, which surrounds the body 201 and on which is articulated, about a transverse axis, one end of a radius arm 216, as well as a frangible element locking the clevis 215 against rotation about the body 201. The other end of the arm 216 is pivoted on the front portion of a balance-beam 220, to the central portion of which is articulated the lower end of the rod 218, and the rear portion of which is formed as a clevis in which a wheel fitted with a tyre 221 is mounted to rotate.

To move from the position in which the landing gear is retracted and as illustrated in FIG. 12, and in which the landing-gear unit is lodged in the fin and is locked in position by means of the hydraulic piston-and-cylinder unit 203, 204, itself locked in the position with the rod extended, into the position in which the gear is extended, all that is required is to cause the rod 203 to move into the cylinder 204 of the piston-and-cylinder unit until locking in the position with the rod retracted is achieved; this causes rotation of the body 201 together with the transverse shaft 212 to which it is solidly connected, and then locking of the leg in the position in which the landing gear is extended. Longitudinal bracing is ensured by the piston-and-cylinder unit 203, 204 and lateral bracing by means of the strut 207, 208. Raising of the wheel is achieved by rotation in the opposite direction brought about by movement of the rod 203 out of the cylinder 204.

Following a landing carried out under normal conditions, the rod 218 of the shock absorber occupies, in the cylinder 217, a position of equilibrium under static load, as illustrated in FIG. 13.

In the case of vertical shock resulting from landing at an excessive vertical speed and effectively causing locking of the rod 218 in the cylinder 217 of the shock absorber, the force, which is transmitted by the cylinder 217 to the body 201 and which is greater than the operating forces of the shock absorber under normal conditions, is greater than the predetermined rupture load of the frangible elements of the means for absorbing energy by means of plastic deformation with which the shock absorber is equipped, so that operation of this means is triggered and the force, which is transmitted to the cell, does not cause the latter to be damaged, since a large proportion of the impact energy is absorbed and dissipated by operation of the shock-absorbing means, over the entire length of the vertical stroke of the cylinder 217 in the body 201.

Following vertical impact, the landing-gear unit occupies the position illustrated in FIG. 14. The cylinder 217 moves past the upper portion of the body 201, and the balance-beam 220 bears against the lower portion of the body or against the clevis 215, the tyre on the wheel 221 having possibly burst after having resiliently absorbed a certain amount of energy on impact and after having dissipated a certain further amount of energy on impact by deformation of the tyre. It should be pointed out that these amounts of energy are respectively absorbed resiliently and dissipated also in the cases of landing under normal conditions, in which may also be added additional dissipation of energy due to skidding of the tyres along the ground, and it should be stated that these amounts, although very much less than those absorbed resiliently and dissipated by the shock absorber, are nevertheless not negligible.

In the case of forward impacts at an excessively high speed and in the region of the wheel 221, the form and inclination of the balance-beam 220 cause the forces, stemming from the obstacle against which the wheel 221 strikes, to be introduced into the rod of the shock absorber 218, which rod, under the same conditions as for a vertical shock at excessive velocity, may become effectively locked in the cylinder 217 even in the case of bursting of the tyre and can cause triggering, at the required level of force, of the means for absorbing energy by plastic deformation, which means is located between the cylinder 217 and the body 201.

In the case where forward impact at an excessively high velocity takes place in the region of the front portion of the balance-beam 220 or of the lower portion of the body 201, the forces deriving from the ground tend to cause the leg of the landing-gear unit to pivot towards the rear about the retraction shaft 212, thereby applying tensile load to the manoeuvring piston-and-cylinder unit comprising the brace 203, 204 which ensures longitudinal bracing. If these tensile forces introduced into the rod 203 of the piston-and-cylinder unit, locked in the position in which the rod is retracted, are greater than the threshold for triggering the means for absorbing energy by plastic deformation with which the piston-and-cylinder unit is equipped, the leg of the landing-gear unit is caused to rotate towards the rear and the rod 203 is moved out of the cylinder 204, with dissipation of a certain amount of impact energy by plastic deformation.

Thus, in certain landing movements at excessive high vertical and horizontal speeds, the means for absorbing energy by plastic deformation included in the shock absorber and the piston-and-cylinder unit may be triggered depending upon the magnitude of the vertical and longitudinal components of the forces from the ground, in relation to the thresholds at which these means are triggered.

In the case where the attitude of the helicopter and its path of movement are such that the landing-gear unit is disposed crosswise with an angle of yaw and the force from the ground has a transverse component which is applied to the wheel 221, the balance-beam 220 and the rod 218 are subjected to a torsional moment about the axis of the shock absorber, and this torsional moment is transmitted by the radius arm 216 to the clevis 215. If the force applied to the clevis 215 in rotation about the body 201 is greater than the predetermined value of the shear load of the frangible element 219, the latter fractures and breaks the connection whereby the clevis 215 and the body 201 rotate in unison. The clevis 215 than pivots, together with the arm 216, about the body 201 and consequently permits the assembly constituted by the wheel 221, the balance-beam 220 and the rod 218 to be brought into the direction in which the force from the ground is applied. There is then a return to the previously envisaged conditions of vertical impact or forward impact, it being understood, of course, that the fracture threshold of the frangible element 219 is less than the fracture thresholds of the frangible elements of the means for absorbing energy by plastic deformation included in the shock absorber and the piston-and-cylinder unit respectively.

In the event of a lateral impact, the wheel 221, the balance-beam 220 and the rod 218 can take up positions in the direction of the force because of fracture of the frangible element 219, as previously explained. However, if the lateral force is greater than the threshold for triggering the means for absorbing energy by plastic deformation which is housed in the strut 207, 208 this force causes the leg of the landing-gear unit to rotate about the spindle 211 either inwardly or outwardly in relation to the helicopter depending upon the direction in which the lateral force is applied, the brace thus being subjected either to tensile load or to compressive load. The strut will limit the force transmitted to the structure of the helicopter by absorbing energy because of its being increased or reduced in length, accompanied by rotation of the body 201 about the spindle 211.

The construction of this landing-gear unit thus permits the limitation to a predetermined value of the force produced by a shock or impact against an obstacle and affecting the strut and the piston-and-cylinder unit, which in normal use, ensure that the legs of the landing-gear unit are rigidly held in an operating position, because of their deformation under tensile and/or compressive load. The main advantage of this landing-gear unit is that of dissociating the normal landing function from the function of affording protection against high-velocity impacts in all possible directions, this protection function being provided by different components depending upon the direction of the impact force.

FIGS. 15 to 18 illustrate a side landing-gear unit of a helicopter main landing gear, which is laterally retracted into the fuselage. This unit comprises a leg constituted by a wish-bone arm 251 and a tubular member 252 which are mounted to pivot relative to each other about a pin 253 at a point approximately halfway along the vertical dimension of the landing gear housing. The arm 251 has two lugs 254, by means of each of which it is mounted to pivot on coaxial pins 253 carried by the main structure of the helicopter. The arm also has a clevis 256 accommodating an attachment boss 257 provided at the upper end of the member 252 for pivoting the latter about pin 253 on the arm 251. On its lower face the arm 251 has an attachment point 258, to which is articulated the end of the rod 259 of a piston-and-cylinder unit such as that previously described by reference to FIGS. 1 to 3; the cylinder 260 of this piston-and-cylinder unit is articulated on a bracket 261 provided at the lower portion of the housing in the fuselage in which the landing-gear unit is lodged in the retracted position, whereas the longitudinal shaft portions 255 are secured in this housing. The tubular member 252 associated with the leg is constituted by the body of a shock absorber such as that previously described by reference to FIGS. 7 to 9, and there is again provided a clevis 262, mounted at the lower end of the member 252. A shock-absorber cylinder 263 extends beyond this lower end and contains a rod 264, the lower end of which supports an outwardly directed axle carrying a wheel 266 fitted with a tyre. The wheel 266 is aligned in relation to the leg of the landing-gear unit by means of a scissors linkage, the upper branch 267 and the lower branch 268 of which are mounted to pivot relative to each other about longitudinal pins and on the clevis 262 and the lower portion 265 of the rod 264 respectively. Near its lower end the tubular member 252 also has a front and rear attachment means 269, 270 on which are respectively articulated the end of the rods 271 and 273 of braces such as that previously described by reference to FIG. 10. The cylinders 272 and 274 of these braces are respectively articulated on brackets 275 and 276 fixedly connected to the structure of the helicopter, at a height intermediate that of the attachment means 261 of the piston-and-cylinder unit and that of the pins 255 and situated respectively forwardly and to the rear of the transverse plane passing through the member 252.

In the position in which the gear is retracted, as illustrated in FIG. 15, the arm 251 and the leg member 252 are in effect disposed one against the other, the longitudinal pin 253 being positioned in the upper portion of the housing above the pins 255, and the landing-gear unit is locked in this retracted position by the piston-and-cylinder unit itself locked in the position in which the rod is extended.

The landing-gear unit is lowered by causing the rod 259 to be retracted in the cylinder 260 of the piston-and-cylinder unit, and this results in downward rotation of the arm 251 about the retraction shaft and downward movement of the member 252 which is held substantially in one attitude during its downward displacement because of its substantially parallelogram-shaped mounting formed by the two braces and the arm 251 together with the vertical wall of the housing. On completing its descent, the landing-gear unit is locked in the position in which the gear is extended by locking of the piston-and-cylinder unit in the position in which its rod is retracted and as illustrated in FIG. 16.

Retraction of the landing-gear unit is achieved by carrying out the reverse operations of moving the rod 259 out of the cylinder 260 of the piston-and-cylinder unit and of rotating the arm 251 upwardly.

In the event of a vertical impact at a velocity greater than the maximum velocity at which the shock absorber is able to function under acceptable conditions, the rod 264 of the shock absorber becomes virtually locked in the cylinder 263, and the means for absorbing energy by plastic deformation, which is housed between the cylinder 263 and the arm 252, is triggered at the required level of force. On completion of the stroke of the cylinder 263 which executes a vertical translatory movement in the member 252, additional energy can be absorbed by the manouevring piston-and-cylinder unit 259, 260 because of its position substantially parallel to that of the drum 252, which position it acquires as a result of the kinetics of the lifting movement if the level for triggering and operating the means for absorbing energy by plastic deformation associated with the piston-and-cylinder unit 259, 260 is higher than that of the shock absorber 263, 264 so as to absorb maximum energy on impact and to delay, as far as possible, movement of the structure into contact with the ground, as illustrated in FIG. 18.

This results in the functioning, in series, of the energy-absorbing means provided respectively in the shock absorber and the manoeuvring piston-and-cylinder unit of the landing-gear units, the effects of which are added to each other so as to limit, as far as possible, the intensity of the force transmitted by the leg of the landing-gear unit to the structure of the cell.

In the event of lateral impact, the two braces 271, 272 and 273, 274 are able to operate simultaneously, under tensile or compressive load, depending upon the direction of the impact, so as to absorb a certain amount of energy and to limit the lateral force transmitted to the cell. The two braces thus tend to oppose any transverse rotation of the member 252 of the landing-gear unit about the pin 253 on which the latter pivots on the arm 251, though the axial components loading these braces are not greater than the value for triggering the means for absorbing energy by plastic deformation with which said braces are equipped.

In the event of longitudinal impact in the forward or rearward direction, the longitudinal forces transmitted by the shock absorber 263, 264 to the cell are limited by the use of a means for absorbing energy by plastic deformation provided by the braces, of which one, situated upstream in the direction of application of the forces resulting from impact, is subjected to tensile load, and the other, located downstream in the direction of these forces, is subjected to compressive load. Appropriate choice of the inclinations of the braces, which simultaneously provide longitudinal and lateral bracing of the landing-gear unit, and appropriate choice of the points at which they are fixed enable improvement of the vertical energy-absorbing means to be avoided.

The landing-gear that has just been described provides the same advantages as that described by reference to FIGS. 11 to 14, in that it also enables the normal landing function to be dissociated from the function of providing protection against high-velocity impacts in all possible directions, this latter function being achieved, in this case too, by means of different components according to the direction in which the impact force is applied.

The invention is not restricted to the two forms of construction of landing-gear systems that have been described; on the contrary, it includes all landing gears equipped with at least one component of the brace, piston-and-cylinder or shock absorber type, in accordance with the invention.

It will be clear that the gear for longitudinal lifting towards the rear illustrated in FIGS. 11 to 14 can be designed to be associated with an aerofoil as well as with a fuselage, and it may be of the balance-beam type, as described, or of the direct slide type as is the case with the gear described by reference to FIGS. 15 to 18, wherein the wheel is carried directly by the lower portion of the shock absorber rod mounted to slide axially in the cylinder and in the tubular element 252 of the leg of the landing-gear unit. Lateral bracing of these gears can be achieved by means of lateral braces which may be located internally andEor externally in relation to the longitudinal plane passing through the leg of the landing-gear unit, these braces being articulated on the leg either above or below the lifting axis.

If the transverse lifting axis extends through the leg between the ground-contact member and the articulation means for the manoeuvring member, longitudinal bracing can be achieved not only by a longitudinal piston-and cylinder unit arranged to the rear of the leg of the landing-gear unit and locked in the position in which the rod is retracted so as to be subjected to tensile load by the forces resulting in impact in the forward direction, but also or alternatively said longitudinal bracing may be achieved by a longitudinal piston-and-cylinder nit which is arranged in front of the landing-gear unit, which is locked in the position in which the rod is extended and which is under compressive load from the force resulting from forward impact.

On the other hand, if the lifting axis passes through the leg below the point at which the manoeuvring piston-and-cylinder unit is articulated on the leg, longitudinal bracing can be achieved by a longitudinal piston-and-cylinder unit arranged to the rear of the leg and locked in the position in which its rod is extended, so as to be compressively loaded by a force resulting from impact in the forward direction, and/or by a longitudinal piston-and-cylinder unit arranged in front of the leg and locked in the position in which the rod is extended so as to be subjected to tensile load by the same type of force.

If the landing-gear unit illustrated in FIGS. 11 to 14 is considered, it is possible to change the brace 207, 208 of the piston-and-cylinder unit 203, 204 about so as to provide for inward transverse lifting of the wheel, the longitudinal bracing and lateral bracing, in the position in which the landing-gear is extended being respectively ensured by a longitudinal brace, arranged behind the leg and tending to oppose rotation of the leg about the transverse shaft 212, and by a lateral piston-and-cylinder unit, arranged within the leg in relation to the aircraft, locked in the position in which the rod is retracted, and tending to oppose inward rotation about the longitudinal pin 211.

In this form of landing-gear, longitudinal bracing is achieved either by a front longitudinal brace and/or by a rear longitudinal brace, one or both of which are articulated on the leg above or below the lifting axis. If the means whereby the piston-and-cylinder unit is attached to the leg is situated below the longitudinal lifting axis, lateral bracing can be achieved by a piston-and-cylinder unit locked in the position in which its rod is extended. p If the laterally lifting fuselage-mounted gear described by reference to FIGS. 15 to 18 is considered, it will be clear that this gear can take the form of a unit comprising a balance-beam.

Finally, the invention is applicable also to fixed landing-gear provided by using, as hydraulic braces, the piston-and-cylinder units with which the above-described landing gears are equipped.

We claim:

1. Main landing gear for aircraft comprising a plurality of ground engaging elements each of which is carried by a leg in the form of a substantially vertical structural support; said support comprising a tubular outer element, an inner element telescopingly engaged in the outer element, one of which elements is capable of plastic deformation, a cage secured to the other of the elements at a location within the tubular outer element, a plurality of rolling members located in respective apertures in the cage and disposed between the inner and outer members, means on said other of the elements for locating the rolling members in a radial position to deform said one element plastically, and a frangible connection between the inner and outer elements which connection locks the inner and outer elements against relative axial movement but is adapted to fracture under a predetermined axial loading applied between the inner and outer elements, whereby fracture of the connection allows relative axial movement of the inner and outer elements which causes the rolling elements to deform said one element plastically and dissipate energy from the force producing the movement, the inner element being tubular and having a tubular piston member mounted therein, and the support further comprising a closure member sealing one end of said inner element, the tubular piston member extending through the other end of the inner element, a transverse wall member in the tubular piston member which wall member has therein a throttling aperture for throttling flow of a fluid between a chamber within the end portion of the inner element closed by the closure member and a second chamber formed in the tubular piston member at the side of the transverse wall remote from the closure member, and an external cylinder member within which said outer tubular element is mounted; and further comprising a balance beam pivotally connected intermediate its ends to the lower end of the leg, the ground engaging element being mounted on one end of the beam, a ring encircling and located against axial movement relative to the external cylinder member, a radius link pivotally connected at its ends to the other end of the beam and the ring about respective horizontal axes, a radially-extending frangible pin securing the ring rotationally to the external cylinder member which pin is adapted to shear when a force above a predetermined value is applied to the ground-engaging element in a direction to swivel the ground-engaging element about the lengthwise axis of the leg.

2. Main landing gear for aircraft comprising a plurality of ground engaging elements each of which is carried by a leg in the form of a substantially vertical structural support; a first support comprising a first tubular outer element, a first inner element telescopingly engaged in the first outer element, one of which elements is capable of plastic deformation, a first cage secured to the other of the elements at a location within the first tubular outer element, a first plurality of rolling members located in respective apertures in the first cage and disposed between the first inner and outer members, first means on said other of the elements for locating the first rolling members in a radial position to deform said one element plastically, and a frangible connection between the first inner and outer elements which connection locks the first inner and outer elements against relative axial movement but is adapted to fracture under a predetermined axial loading applied between the first inner and outer elements, whereby fracture of the connection allows relative axial movement of the first inner and outer elements which causes the first rolling elements to deform said one element plastically and dissipate energy from the force producing the movement, the first inner element being tubular and having a tubular piston member mounted therein, and the first support further comprising a closure member sealing one end of said first inner element, the tubular piston member extending through the other end of the first inner element, a transverse wall member in the tubular piston member which wall member has therein a throttling aperture for throttling flow of a fluid between a chamber within the end portion of the first inner element closed by the closure member and a second chamber formed in the tubular piston member at the side of the transverse wall remote from the closure member, and an external cylinder member within which said first outer tubular element is mounted;

and further comprising a horizontal fixed shaft having an end to which the leg is pivotally connected at an intermediate point in the length of the leg, and a second structural support pivotally connected between a fixed part of the aircraft and a point on the leg above the horizontal shaft, which second support member operates to support the leg against displacement and to rotate the leg about its pivotal connection to the horizontal shaft to raise and lower said ground engaging element, said second support comprising a second tubular outer element, a second inner element telescopingly engaged in the second outer element, one of which elements is capable of plastic deformation, a second cage secured to the other of the elements at a location within the second tubular outer element, a second plurality of rolling members located in respective apertures in the second cage and disposed between the second inner and outer members, second means on said other of the second elements for locating the second rolling members in a radial position to deform said one element plastically, and a frangible connection between the second inner and outer elements which connection locks the second inner and outer elements against relative axial movement but is adapted to fracture under a predetermined axial loading applied between the second inner and outer elements, whereby fracture of the connection allows relative axial movement of the second inner and outer elements which causes the second rolling elements to deform said one element plastically and dissipate energy from the force producing the movement; the leg is further connected to said horizontal shaft for pivotal movement about a horizontal axis at right angles to the axis of the shaft, and further comprises a brace connected by its respective ends to the leg at a point above the horizontal shaft and to a fixed point for pivotal movement relative to the leg and the shaft about horizontal axes at right angles to the axis of the horizontal shaft whereby the brace resists rotation of the leg about said horizontal axis at right angles to the axis of the shaft, said brace comprising a third tubular outer element, a third inner element telescopingly engaged in the third outer element, one of which elements is capable of plastic deformation, a third cage secured to the other of the elements at a location within the third tubular outer element, a third plurality of rolling members located in respective apertures in the third cage and disposed between the third inner and outer members, third means on said other of the elements for locating the third rolling members in a radial position to deform said one element plastically, and a frangible connection between the third inner and outer elements which connection locks the third inner and outer elements against relative axial movement but is adapted to fracture under a predetermined axial loading applied between the third inner and outer elements, whereby fracture of the connection allows relative axial movement of the third inner and outer elements which causes the rolling elements to deform said one element plastically and dissipate energy from the force producing the movement.

3. Main landing gear for aircraft comprising a plurality of ground engaging elements each of which is carried by a leg in the form of a substantially vertical structural support; said substantially vertical structural support and also an actuating support and a bracing support each comprising a tubular outer element, an inner element telescopingly engaged in the outer element, one of which element is capable of plastic deformation, a cage secured to the other of the elements at a location within the tubular outer element, a plurality of rolling members located in respective apertures in the cage and disposed between the inner and outer members, means on said other of the elements for locating the rolling members in a radial position to deform said one element plastically, and a frangible connection between the inner and outer elements which connection locks the inner and outer elements against relative axial movement but is adapted to fracture under a predetermined axial loading applied between the inner and outer elements, whereby fracture of the connection allows relative axial movement of the inner and outer elements which causes the rolling elements to deform said one element plastically and dissipate energy from the force producing the movement; and further in said substantially vertical structural support, the inner element being tubular and having a tubular piston member mounted therein, and the support further comprising a closure member sealing one end of said inner element, the tubular piston member extending through the other end of the inner element, a transverse wall member in the tubular piston member which wall member has therein a throttling aperture for throttling flow of a fluid between a chamber within the end portion of the inner element closed by the closure member and a second chamber formed in the tubular piston member at the side of the transverse wall remote from the closure member, and an external cylinder member within which said outer tubular element is mounted; the ground-engaging element connected to the tubular piston member, and further comprising a wishbone link having its oppostee ends connected to a fixed structure and the end of the cylinder member remote from the ground-engaging element for pivotal movement about respective parallel horizontal axes, the actuating support connected between the fixed structure and an intermediate point in the length of the wishbone link about respective axes parallel to said parallel horizontal axes, the actuating support connected between the fixed structure and an intermediate point in the length of the wishbone link about respective axes parallel to said parallel horizontal axes, the lengthwise axes of the leg, the wishbone link and the actuating support defining a common substantially vertical plane, and the bracing support pivotally connected between the fixed structure and the external cylindrical member and extending at an angle to said plane.

* * * * *